United States Patent
Veselov et al.

(10) Patent No.: US 11,003,837 B2
(45) Date of Patent: May 11, 2021

(54) CONTROLLING MARK POSITIONS IN DOCUMENTS

(71) Applicant: Microsoft Technology Licensing, LLC, Redmond, WA (US)

(72) Inventors: Evgeny Veselov, Sammamish, WA (US); Sergey Dubinets, Redmond, WA (US); Brian Robert Marshall, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 50 days.

(21) Appl. No.: 16/416,510

(22) Filed: May 20, 2019

(65) Prior Publication Data

US 2020/0349220 A1  Nov. 5, 2020

Related U.S. Application Data

(60) Provisional application No. 62/842,688, filed on May 3, 2019.

(51) Int. Cl.
*G06F 40/154* (2020.01)
*G06F 9/50* (2006.01)
*G06F 40/166* (2020.01)

(52) U.S. Cl.
CPC .......... *G06F 40/154* (2020.01); *G06F 9/5016* (2013.01); *G06F 9/5022* (2013.01); *G06F 40/166* (2020.01)

(58) Field of Classification Search
CPC .... G06F 40/166; G06F 40/154; G06F 9/5016; G06F 9/5022

USPC ......................................................... 715/234
See application file for complete search history.

(56) References Cited

U.S. PATENT DOCUMENTS

| | | | |
|---|---|---|---|
| 7,228,496 B2 | 6/2007 | Hamada | |
| 8,627,202 B2 | 1/2014 | De Magalhaes | |
| 2002/0188636 A1* | 12/2002 | Peck | G06F 40/166 715/255 |
| 2007/0061704 A1* | 3/2007 | Simova | G06F 40/14 715/210 |
| 2007/0198534 A1* | 8/2007 | Hon | G06F 16/44 |
| 2008/0098412 A1 | 4/2008 | Zhou et al. | |
| 2008/0228789 A1 | 9/2008 | Asakawa et al. | |

(Continued)

FOREIGN PATENT DOCUMENTS

JP   4686177 B2   5/2011

OTHER PUBLICATIONS

"Piece Chains," Catch22, Sep. 12, 2006, www.catch22.net/tuts/neatpad/piece-chains. (Year: 2006).*

(Continued)

*Primary Examiner* — Stephen S Hong
*Assistant Examiner* — Broderick C Anderson
(74) *Attorney, Agent, or Firm* — Christopher J. Volkmann; Kelly, Holt & Christenson, PLLC

(57) ABSTRACT

A document is represented as a node tree in a document processing system. Edits to a node are represented in a change record that has a one-way link to the node. A text mark has a one-way link to the change record. It deletes that link when the changes represented by the change record are reflected in the text mark. A memory management system releases the memory allocated to the change record when no other object links to it.

20 Claims, 15 Drawing Sheets

(56) References Cited

U.S. PATENT DOCUMENTS

| | | | | |
|---|---|---|---|---|
| 2009/0094579 A1* | 4/2009 | Na | ........................ | G06F 40/103 |
| | | | | 717/110 |
| 2010/0070721 A1* | 3/2010 | Pugh | ........................ | G06F 9/52 |
| | | | | 711/162 |
| 2012/0331375 A1 | 12/2012 | Fanning et al. | | |
| 2013/0227397 A1 | 8/2013 | Tvorun et al. | | |

OTHER PUBLICATIONS

Avery Laird, "Piece Tables, Splay Trees, and 'Trables' (Oh My!)", publisher: averylaird.com, published: May 10, 2018, pp. 1-6 (Year: 2018).*

Crowley, Charles. "Data Structures for Text Sequences." Jun. 10, 1998, pp. 1-29. (Year: 1998).*

Gouarne, et al., "ODF::lpOD:TextElement", Retrieved From: https://metacpan.org/pod/distribution/ODF-lpOD/lpOD/TextElement.pod, 31 Pages.

"International Search Report and Written Opinion Issued in PCT Application No. PCT/US20/026979", dated Jul. 30, 2020, 10 Pages.

* cited by examiner

US 11,003,837 B2

CONTROLLING MARK POSITIONS IN DOCUMENTS

CROSS-REFERENCE TO RELATED APPLICATION

The present application is based on and claims the benefit of U.S. provisional patent application Ser. No. 62/842,688, filed May 3, 2019, the content of which is hereby incorporated by reference in its entirety.

BACKGROUND

Computer systems are currently in wide use. Some such systems include host systems that host a service at a remote server location, for access by client computing systems.

For example, one such system is a host computing system that hosts a content creation service. The content creation service can allow client computing systems to create and manage content. Some examples include hosted word processing services, spreadsheet services, document management services, slide presentation services, among a wide variety of others.

These types of computing systems have a front end that exposes an interface that can be accessed by client computing systems. In one example, the client computing systems communicate with the remote server environment through a browser-based interface. For instance, it may be that a user is using a client computing system to interact with a hosted word processing service, through a browser-based interface. The user can invoke a content editing system on the client computing system to edit a document that has been created and stored on the remote word processing service.

In order to do that, the document can be represented to the content editing system as a tree of connected nodes. The nodes are organized into a hierarchical tree and the job of the content editing system is to modify the tree in response to user inputs. Nodes in the tree are organized in a bidirectionally linked manner where a parent node references its children nodes and all children reference their parent node. Children can also be linked with one another as next and following siblings.

The tree can include, for instance, a root node that represents the entire document. Child nodes (or first level child nodes which depend directly from the root node) may represent sections in the document, paragraphs in the document, etc. Child nodes from the first level child nodes may represent items within each section or paragraph, such as text, an image, a table, etc.

In some areas, the content editing system needs to create and maintain references to specific positions in the content tree. Text processing systems often deal with this by creating objects that behave as persistent pointers into the content. These objects can be referred to as markup pointers, node locations, or text marks and will be referred to herein as a position mark, or as a text mark. A position mark can refer to a position within the document or content by referring to a node in the node tree and then having an offset value which reflects the tracked position offset within the node that is to be tracked.

For example, when performing a text selection operation or a text insertion operation, the position of the text that is selected or the position where the text is to be inserted needs to be maintained. By way of example, selection in a text document is performed by generating a pair of position marks (references to positions in text). These positions can be the start position and end position of the selected text. The span between the two positions is considered "selected" and can be used as a target of editing operations (such as formatting, deleting, copying, etc.).

Another example of a use for a position mark is in pagination. After organizing the content of a document into multiple pages, the content editing system keeps references to beginnings and endings of each of the pages, which are again, represented as positions in the content tree.

In order to maintain their persistence during content modification, position marks are often implemented using doubly-linked structures. That is, a position mark object refers to a node in the content node tree, and the node refers back to the position mark so that the position mark can be corrected when the content near the position mark is deleted or modified.

The discussion above is merely provided for general background information and is not intended to be used as an aid in determining the scope of the claimed subject matter.

SUMMARY

A document is represented as a node tree in a document processing system. Edits to a node are represented in a change record that has a one-way link to the node. A position mark has a one-way link to the change record. It deletes that link when the changes represented by the change record are reflected in the position mark. A memory management system releases the memory allocated to the change record when no other object links to it.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As mentioned above, a position mark may be represented by a combination of a reference to a node in the content tree and a character offset within that node. However, when the content within the node is modified, then the position mark may become invalidated. For instance, if text is deleted from the node, then the offset value may not be accurate. The same is true if the content in the node is moved, if insertions are made, etc.

One way that this has been dealt with is to use the bidirectional linking discussed above (e.g., attach the position mark to the node by a strong reference in which the position mark holds a reference to the node to which it is attached, and the node also holds a reference back to the position mark that is attached to it). In those scenarios, when a node is modified, the position marks that are attached to the node are also modified by logic within the node itself. This, of course, means that the node must have a reference back to all the position marks that are attached to it. This can present problems.

For instance, where the content editing system no longer needs a position mark, it may release that position mark by deleting its reference to that position mark. In some computing systems, garbage collection or other memory management systems will release memory when there is no reference to a particular object in memory. However, even if the content editing system deletes its reference to a position mark, that position mark will still have a reference to it, from the node it is attached to. The node will not know that the content editing system has released that position mark, and therefore it will not remove its reference to that position mark. This will prevent the position mark from being released within the memory corresponding to the node tree, which leads to a larger memory footprint for the node tree. This can lead to memory overrun situations or it can lead to an undesirably large memory footprint for the node tree.

Figure 1:
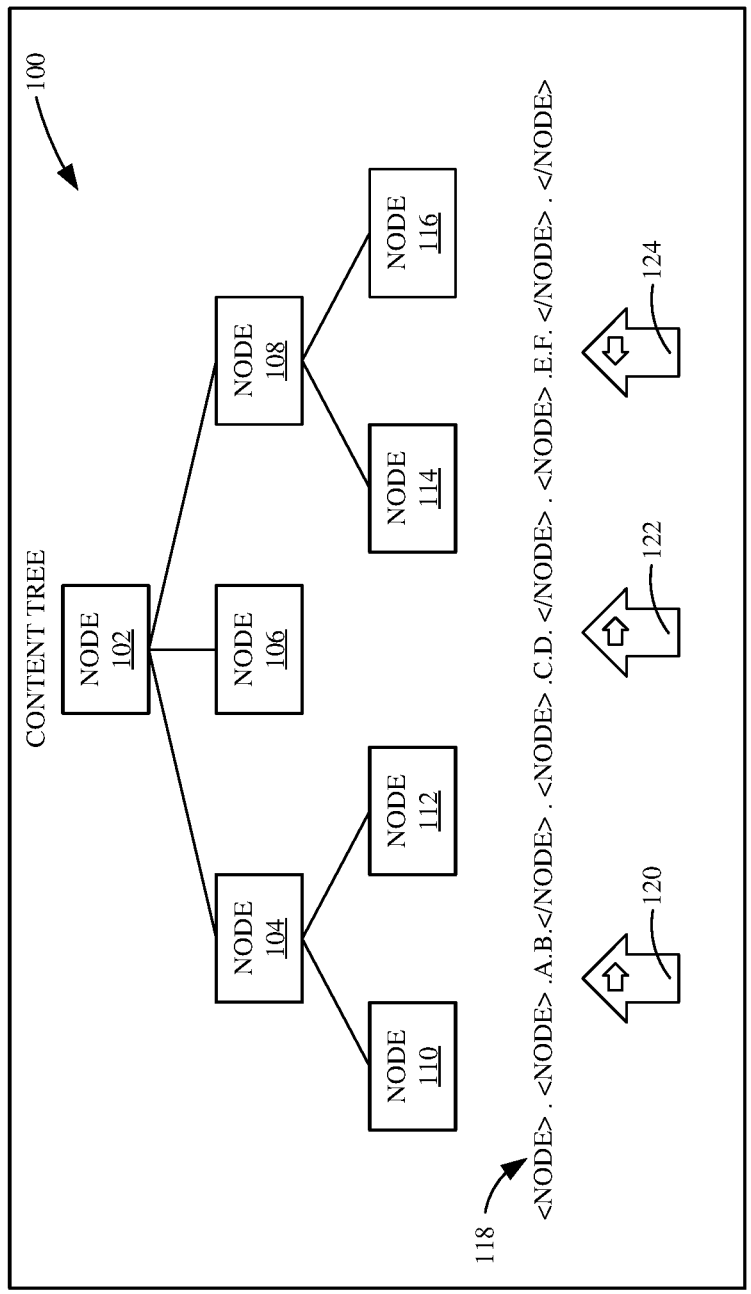
FIG. 1 is a diagram of one example of a content tree.

FIG. 1 shows one example of a content tree 100 that represents a document. Content tree 100 includes a set of nodes that are linked to one another. The nodes include root node 102, child nodes 104, 106 and 108 (which are child nodes with root node 102 as their parent), and other child nodes 110-112 (which are children of node 104) and nodes 114 and 116 (which are children of node 108). FIG. 1 also includes an example of a portion 118 of an HTML representation 118 of the content tree 100. The arrows 120, 122 and 124 represent position marks. The position marks 120 and 122, for instance, may represent content (e.g., text) selection so that the span between position marks 120 and 122 identifies the selected content. Position mark 124 may represent, for instance, a bookmark or pagination mark. These are examples only.

It can be seen that when one of the nodes is changed, and that node is referred to by a position mark, the position mark may become invalid. By way of example, assume that position mark 120 is represented, in memory, as a node reference (which refers to node 112), and an offset reference which refers to the character offset within node 112 where the position mark position is located. If some content in node 112 is deleted, this may render the offset value in position mark 120 invalid.

In some current systems, in order to remedy this situation, node 112 would include a reference back to position mark 120. When node 112 was changed, the logic in node 112 would change position mark 120, when needed, in order to ensure that position mark 120 points to the proper position within node 112. However, this means that node 112 has a reference back to position mark 120. This can be problematic, as discussed above, because when a content editing system releases its reference to position mark 120 (because it is no longer needed) the object in memory that represents position mark 120 will not be released because node 112 will still hold a reference to it.

The present description thus describes a system in which the nodes in content tree 100 do not have references to position marks that are attached to them. Instead, the references only go one way. That is, each of the position marks only has a reference in a direction toward its corresponding node, but the node does not have a reference back to those position marks. The position marks thus include logic to update themselves if the node they are attached to is changed. This is described in greater detail below.

Figure 2:
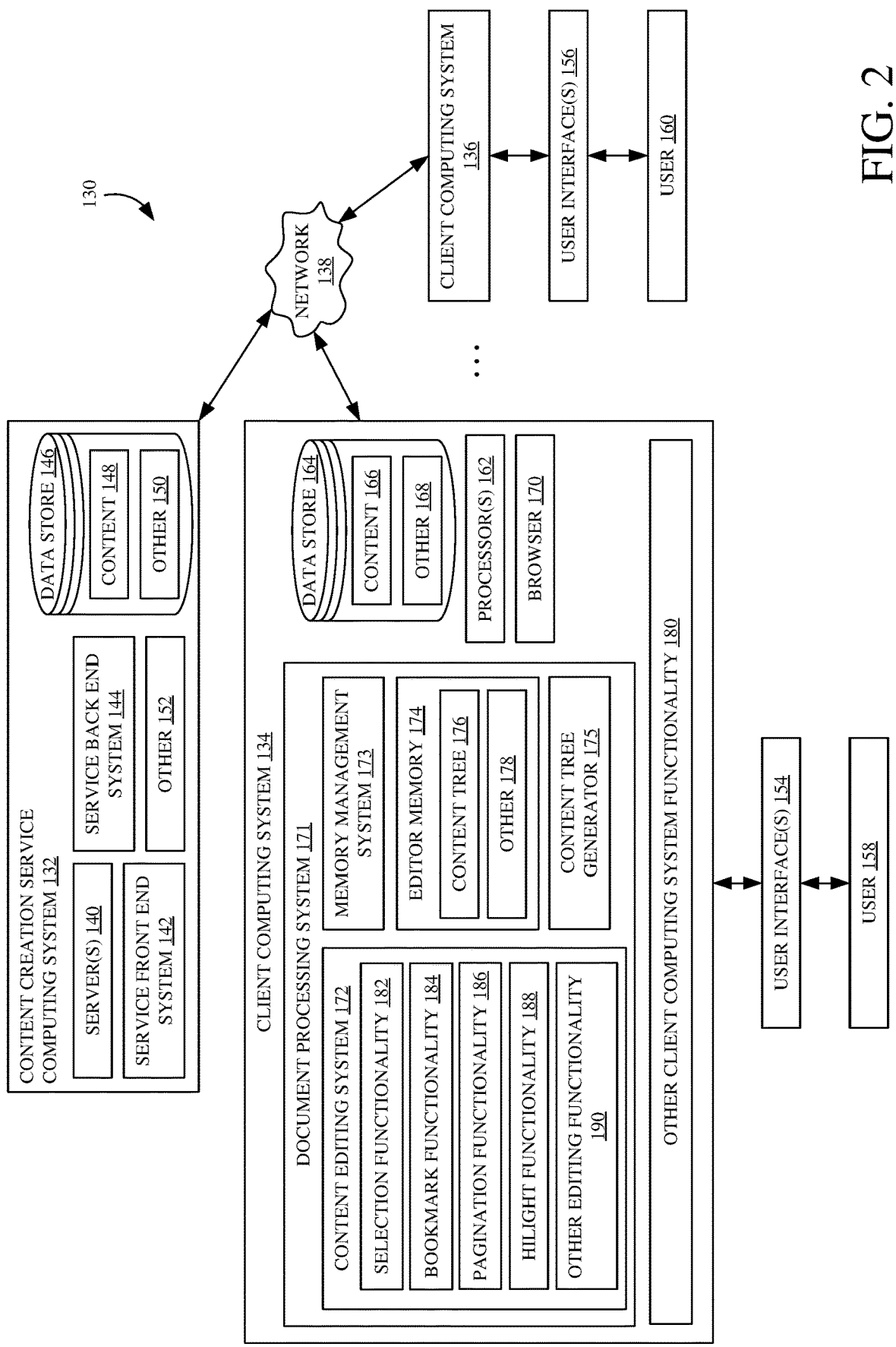
FIG. 2 is a block diagram showing one example of a computing system architecture.

FIG. 2 is a block diagram of one example of a computing system architecture 130 in which position marks can be used. Architecture 130 illustratively includes content creation service computing system 132, and a plurality of different client computing systems 134-136 which can be connected to content creation service computing system 132 through network 138. Thus, network 138 can be a local area network, a wide area network, a cellular communication network, a near field communication network, or any of a wide variety of networks or combinations of networks.

Content creation service computing system 132 illustratively includes a set of servers 140, a service front end system 142, a service back end system 144, data store 146 (which can store content 148 and other items 150) and it can include other items 152. Service front end system 142 exposes interfaces that can be accessed by client computing systems 134 and 136 in order to create, modify and otherwise manage content 148, such as documents. In doing so, front end computing system 142 receives inputs through the exposed interface and interacts with service back end system 144 which, itself, performs operational steps on content 148 based on the inputs received by service front end system 142.

Client computing systems 134 and 136 are shown generating user interfaces 154 and 156 for interaction by users 158 and 160, respectively. User 158 illustratively interacts with user interface 154 in order to control and manipulate client computing system 134 and some portions of content creation service computing system 132. Similarly, user 160 can interact with user interfaces 156 in order to control and manipulate client computing system 136 and some portions of content creation service computing system 132. Client computing systems 134 and 136 may be similar or different. For purposes of the present discussion, it will be assumed that they are similar so that only client computing system 134 is described herein, in more detail. This is by way of example only.

Client computing system 134, in one example, includes one or more processors 162, data store 164 (which can store content 166—which may be a representation of some content 148 or different content) and it can include other items 168. System 134 also illustratively includes browser 170, and document processing system 171. System 171 can include content editing system 172, memory management system 173, and editor memory 174 which may be used by content editing system 172 during editing of content 166. Editor memory 174 may include a content tree 176 that represents the content being edited, and it can include other items 178. System 134 can include a wide variety of other client computing system functionality 180.

It will be noted that content 148 and 166 can be stored in data stores 146 and 164 as content trees. It can also be stored in a different structure. When the content is loaded into editor memory 174, it is loaded as a content tree 176. Content tree 176 can include the content itself or a reference to a different structure that holds the content.

In the example shown in FIG. 1, content editing system 172 can include a wide variety of different types of editing functionality. For instance, system 172 can include selection functionality 182 that allows system 172 to select portions of content represented by content tree 176 for editing. System 172 can include bookmark functionality 184 which allows system 172 to maintain a bookmark within the content tree 176. System 172 can include pagination functionality 186 that allows system 172 to identify page breaks in the content represented by content tree 176. System 172 can include highlight functionality 188 which allows system 172 to perform highlights in the content being edited, and it can of course include a wide variety of other editing functionality 190 that allows system 172 to perform a wide variety of other editing functions, such as content move functions, delete functions, copy and paste functions, etc.

In order to edit a document (which may be stored as content 148 on computing system 132), client computing system 134 illustratively allows user 158 to invoke content editing system 172 which edits the content, based on user inputs, through a browser-based interface using browser 170. Content editing system 172 first downloads the content to be edited and loads a corresponding content tree 176, representing that content, into editor memory 174. It then edits the content tree 176 based on user inputs from user 158 through user interfaces 154. In performing those editing operations, content editing system 172 may use position marks. Memory management system 173 illustratively manages editor memory 174. Therefore, system 173 allocates memory for content tree 176 (and as will be described below, change records and position marks). It also releases that memory when objects are no longer referred to by other objects in editor memory 174. This is all described in greater detail below.

Before describing the use of position marks in more detail, a brief description of some of the items in content tree 176 will first be described.

Figure 3:
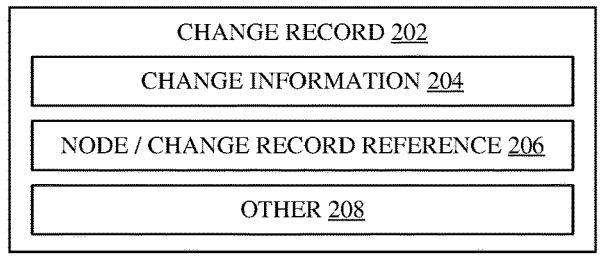
FIG. 3 is a block diagram of one example of a change record.

FIG. 3 is a block diagram of one example of a change record 202 that can be created as an object in memory 174 by a node (such as node 112 shown in FIG. 1) when content editing system 172 changes the information in node 112 using an edit operation. FIG. 3 shows that change record 202 can include change information 204, node/change record reference 206, and it can include other items 208. Change information 204 represents the information that was changed by content editing system 172 in the node (e.g., node 112) which created change record 202. Node/change record reference 206 is a reference to either node 112, or to a subsequent change record that will be generated based on subsequent changes to node 112 by content editing system 172. Change record 202 can include other items 208. Thus, once created, change record 202 represents changes made to node 112 by content editing system 172 and it includes a one-way reference or link to the node 112 that created it.

Figure 4:
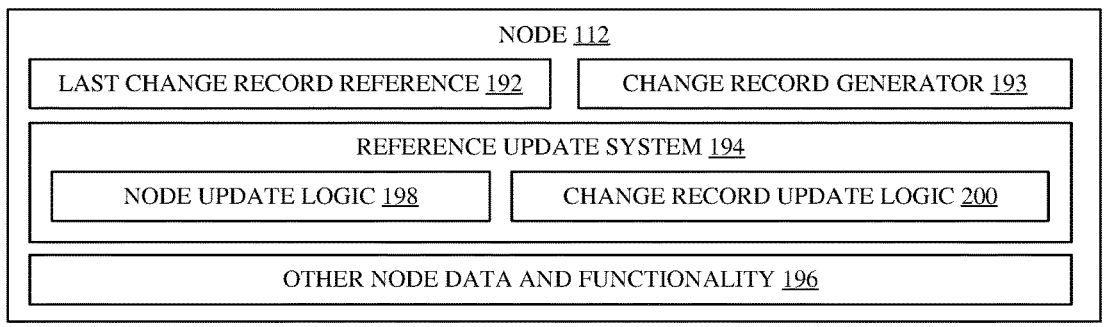
FIG. 4 is a block diagram of one example of a node.

FIG. 4 shows one example of a node, such as node 112, in the content tree 100 shown in FIG. 1. Node 112 is illustratively an object in memory 174 that includes content data that the node represents and logic that is executed under certain circumstances, such as when a change is made to the content in the node. In another example, the nodes share some or all logic across nodes. In yet another example, the nodes do not hold the content, but hold references into another structure that holds the content. In the example shown in FIG. 4, node 112 includes last change record reference 192, change record generator 193, reference update system 194 and it can include other node data and functionality 196 (which can include the content represented by the node).

The last change record reference 192 is a reference to a most recent change record that reflects changes to node 112 most recently made by content editing system 172. One example of a change record is described in more detail above with respect to FIG. 3. Reference update system 194 illustratively includes node update logic 198 and change record update logic 200. Change record generator 193 generates a change record that represents the changed data. Node update logic 198 updates the last change record reference 192 so that it refers to the newly created change record. Change record update logic 200 modifies the reference in the change record so that it points to the newly created change record, instead of to node 112.

Figure 5:
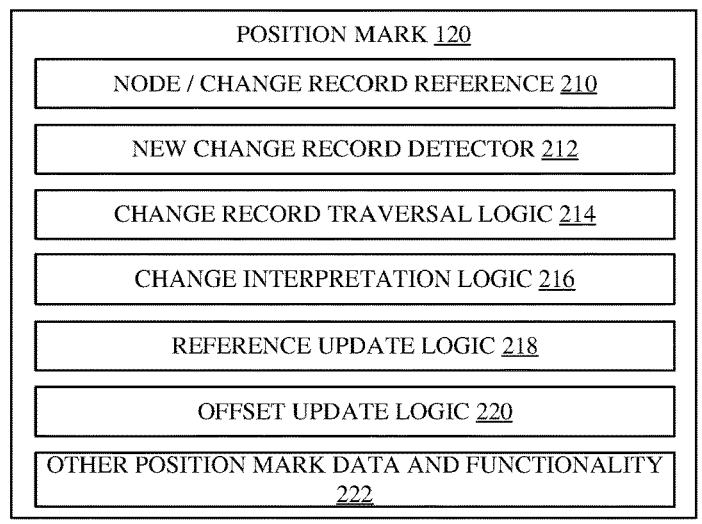
FIG. 5 is a block diagram of one example of a text mark.

FIG. 5 shows an example of a position mark (such as position mark 120 shown in FIG. 1). Position mark 120 is illustratively an object in memory 174 that includes a reference to another object in memory and logic that is executed under certain circumstances. As with nodes, position marks can include their own logic or share logic across other objects. In the example shown in FIG. 5, position mark 120 includes node/change record reference 210, new change record detector 212, change record traversal logic 214, change interpretation logic 216, reference update logic 218, offset update logic 220, and it can include a wide variety of other position mark data and functionality 222. Node/change record reference 210 refers to node 112, or any intervening change records 202 that have been generated by node 112 and to which position mark 120 refers. Reference 210 can also include an offset value indicative of an offset within the node it refers to, to identify a specific position in the content represented by tree 100.

New change record detector 212 detects when a new change record 202 has been generated by node 112. For instance, it can detect that the node/change record reference 206 in change record 202 has been updated to point to a new change record, instead of to node 112. It can detect a new change record in other ways as well.

Change record traversal logic 214 illustratively traverses the references from the change record to which position mark 120 refers, up through all intervening change records to node 112. Change interpretation logic 216 interprets the change information 204 in each of the change records that are traversed to identify an overall change value that represents the overall changes that have been made to node 112, and that are represented by the traversed change records.

Reference update logic 218 then updates node/change record reference 210 so that it refers to the most recent change record. Offset update logic 220 modifies the offset value in position mark 120 based upon the changes reflected in the various change records traversed by change record traversal logic 214.

Figure 6A:
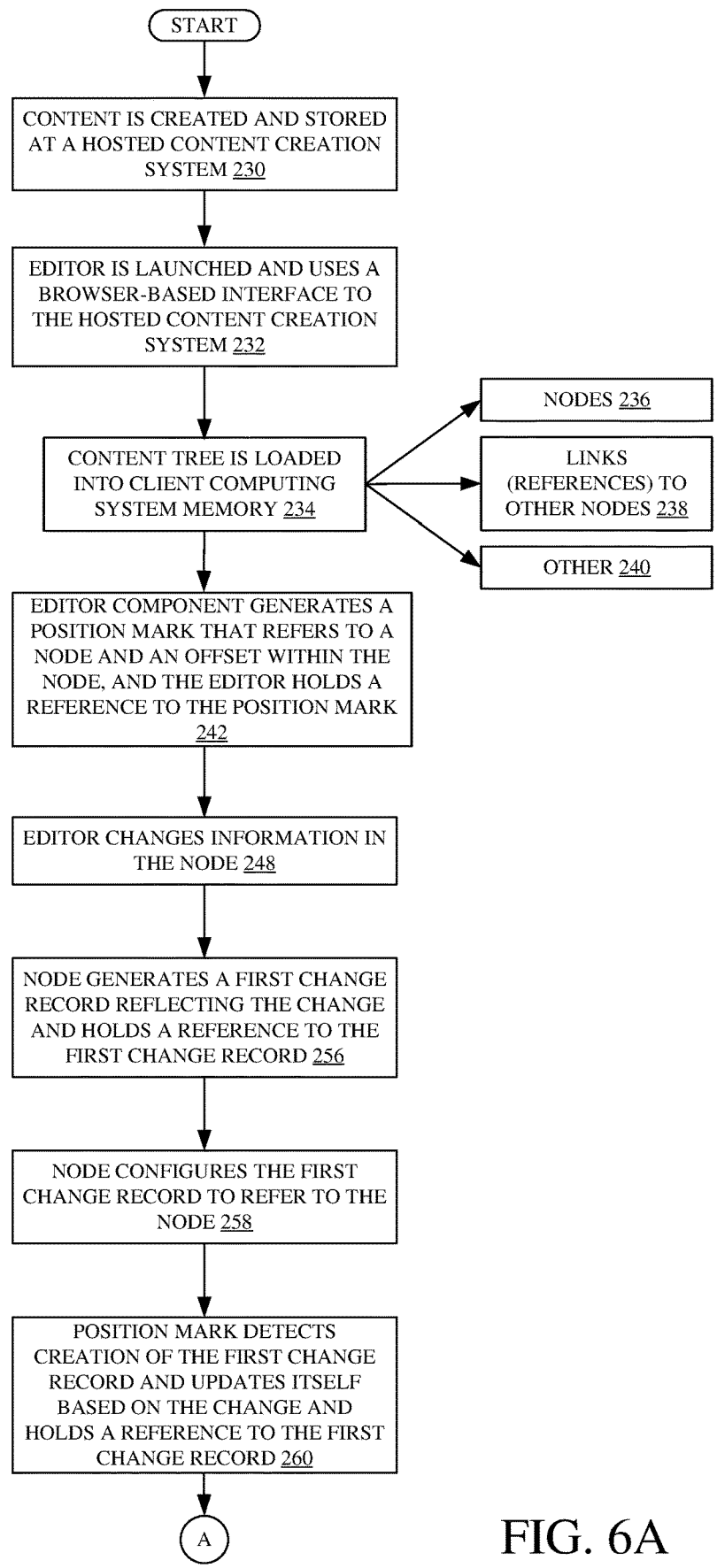
FIGS. 6A-6C (collectively referred to herein as FIG. 6) show a flow diagram illustrating one example of the operation of the architecture shown on FIG. 2.
Figure 6B:
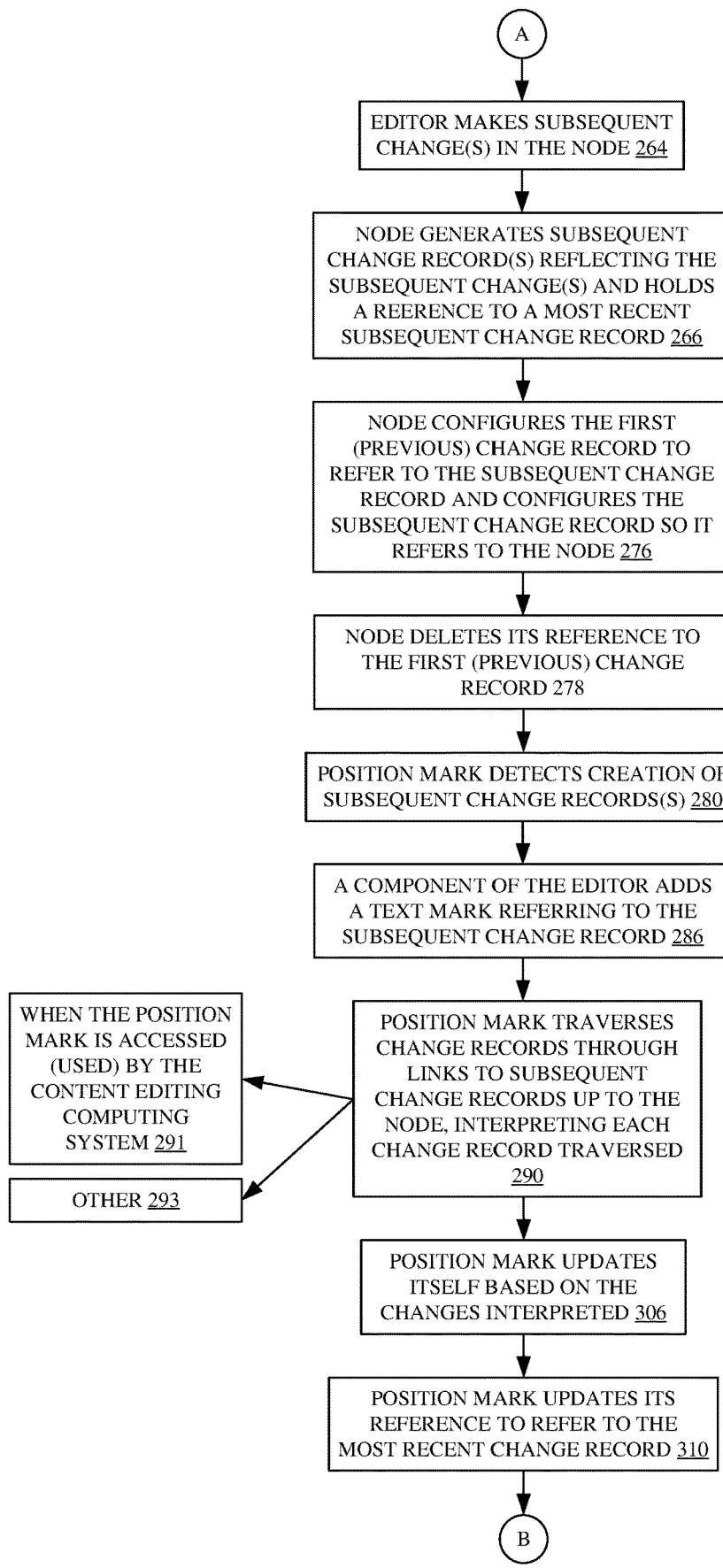
Figure 6C:
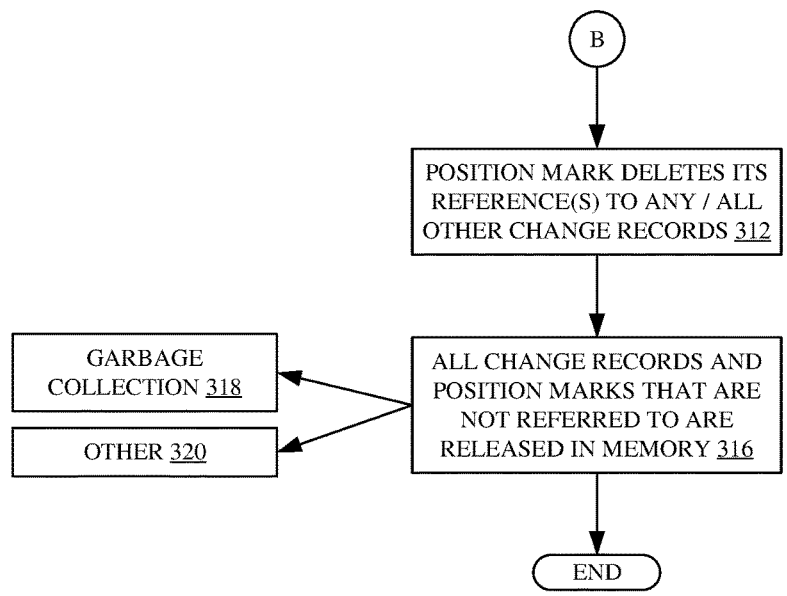

FIGS. 6A-6C (collectively referred to herein as FIG. 6) show a flow diagram illustrating one example of the operation of content editing system 172, memory management system 173, and content tree 176 in maintaining and managing position marks. It is first assumed that some item of content 148 has been generated and stored in hosted content creation computing system 132. The item of content can be a word processing document, a spreadsheet document, a slide presentation document, or another item of content. This is indicated by block 230 in the flow diagram of FIG. 6. Next, it is assumed that user 158 has interacted with interfaces 154 in order to launch or invoke content editing system 172 to edit content 148. In doing so, the content 148 that is being edited can be downloaded into data store 164, or the content tree 176 corresponding to the content to be edited can be downloaded to client computing system 134, and stored, by memory management system 173, in editor memory 174. The editor memory 174 may be part of content editing system 172 or separate therefrom. Content editing system 122 and memory management system 173 illustratively use a browser-based interface implemented by browser 170, in order to interact with content tree 176 and content creation service computing system 132. Launching or invoking content editing system 172 is indicated by block 232 in the flow diagram of FIG. 6. Loading the content tree into the client computing system memory 174 is indicated by block 234.

As discussed above, the content tree 176 can include nodes which are represented by block 236 in the flow diagram of FIG. 6. The nodes can have links or references to other nodes in a parent/child relationship, or a sibling relationship. This is indicated by block 238. The content tree can include other items 240 as well.

At some point, a component of content editing system 172 creates a position mark and holds a reference to that position mark. The position mark, itself, refers to a node in the content tree and it also includes an offset, within the node, identifying a particular position in the node, and thus in the document represented by tree 100. This is indicated by block 242 in the flow diagram of FIG. 6.

Figure 7A:
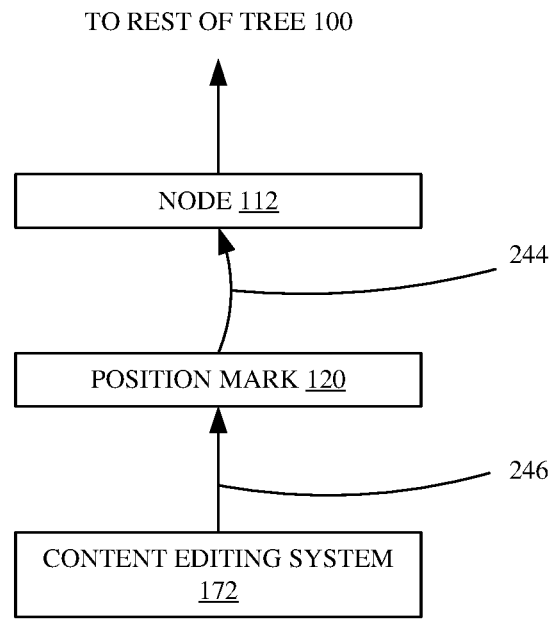
FIGS. 7A-7H show examples of memory management.

FIGS. 7A-7G show a sequence of diagrams that will be discussed in conjunction with FIGS. 2-6. FIG. 7A shows an example in which node 112 (of content tree 100), is shown. FIG. 7A also shows that a component of content editing system 172 has generated a position mark (e.g., position mark 120) which holds a reference to node 112, the reference being indicated by arrow 244. It is assumed, for the sake of example, that the selection functionality 182 in content editing system 172 holds a reference to position mark 120, for the purpose of performing content selection. The reference is indicated by arrow 246 in FIG. 7A.

Next, it is assumed that user 158 interacts with interfaces 154 causing content editing system 172 to change information in node 112. This is indicated by block 248 in the flow diagram of FIG. 6. The changes can be any changes, such as copy and paste, selection, moving text, deleting information, adding information, modifying information, etc.

In response to that change, the change record generator 193 in node 112 generates a change record to reflect the changed information. The change record is identified at 250 in FIG. 7B. Change record update logic 200 in node 112 then updates change record 250 to add a reference in change record 250 to node 112. This is indicated by arrow 252 in the flow diagram of FIG. 7B. Node update logic 198 then updates the node 112, itself, so that the last change record reference 192 now holds a reference to change record 250. This is indicated by arrow 254 in FIG. 7B. Generating the first change record 250 that reflects the change, and holding the reference 254 to that change record, is indicated by block 256 in the flow diagram of FIG. 6. Having node 112 configure the change record 250 so that it holds a reference 252 to node 112 is indicated by block 258.

New change record detector 212 detects that node 112 has created change record 250. Reference update logic 218 then updates the node/change record reference 210 (in position mark 120) so that it now refers to the change record 250, instead of to node 112. This is indicated by block 260 in the flow diagram of FIG. 6, and this reference is indicated by arrow 262 in FIG. 7B.

It may be that, at some point, content editing system 172 makes another change to node 112, subsequent to the change reflected in change record 250. This is indicated by block 264 in the flow diagram of FIG. 6. At that point, change record generator 193 generates a subsequent change record to reflect the newly made changes by content editing system 172. Node update logic 198 then updates the change record reference 192 in node 112 so that it now refers to the subsequent change record (or most recent change record) just generated by node 112. This is indicated by block 266 in the flow diagram of FIG. 6.

Change record update logic 200 configures the newly created change record so that it includes a reference back to node 112. It also configures the previous change record 250 so that it now contains a reference to the subsequent change record, instead of to the node 112, itself. The results of this are shown in FIG. 7C.

Figure 7B:
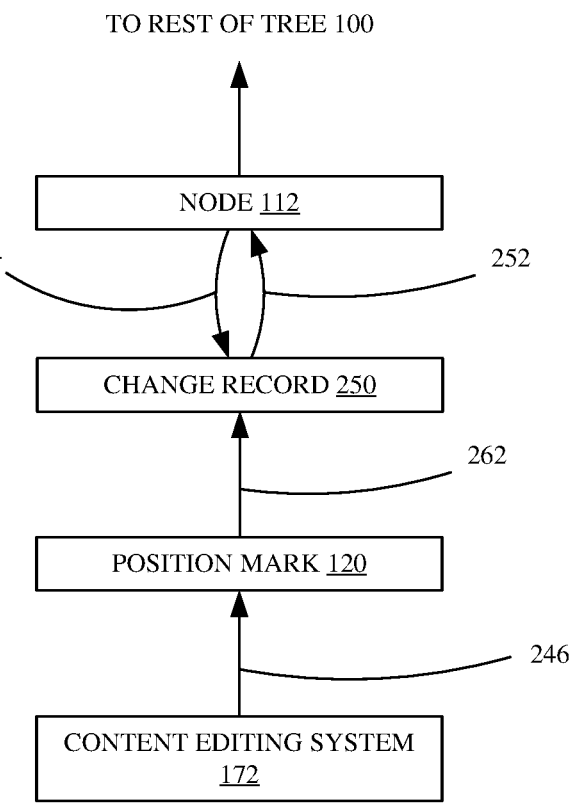
Figure 7C:
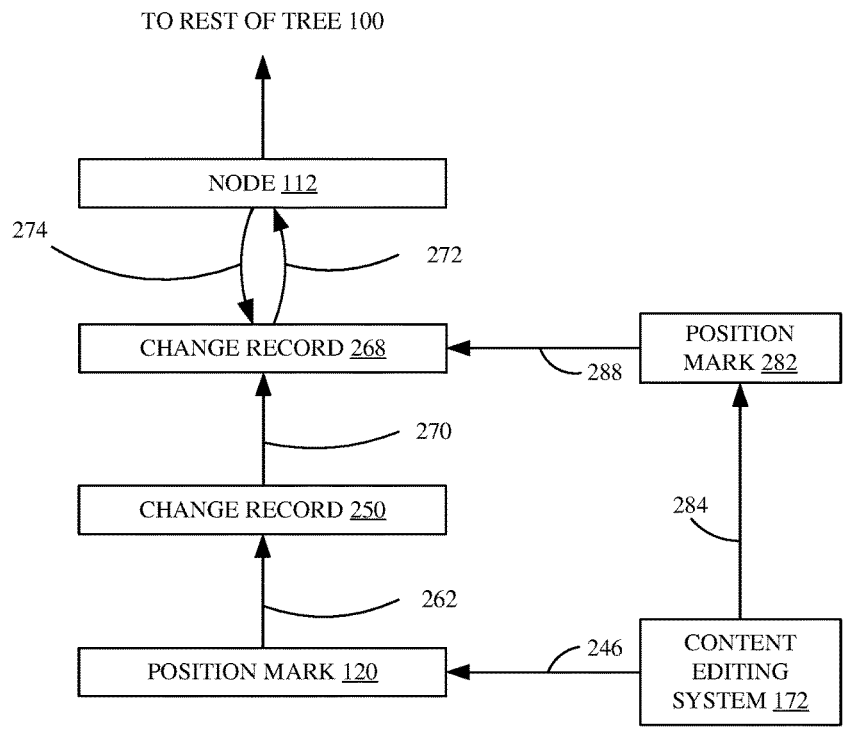

FIG. 7C is similar to FIG. 7B, except it now shows that node 112 has created a new (or subsequent) change record 268. FIG. 7C shows that change record 250 now has a reference 270 to the newly created change record 268, instead of to node 112. It also shows that change record 268 has a reference 272 to node 112, and that node 112 now has a reference 274 to change record 268, instead of to change record 250. Having the node 112 configure change record 250 so that its reference 270 now points to change record 268 is shown at block 276 in the flow diagram of FIG. 6. Having node 112 configure the newly created change record 268, and configuring change record 268 so that it refers (by arrow 272) to node 112 is also indicated by block 276.

Reference update system 194 then deletes the reference in node 112 to change record 250. This is indicated by block 278 in the flow diagram of FIG. 6. New change record detector 212 in position mark 120 detects creation of the subsequent change record 268. This is indicated by block 280 in the flow diagram of FIG. 6. Also, for the sake of example, it is assumed that a component of content editing system 172 creates a new position mark 282 with a reference to change record 268. Thus, content editing system 172 also holds a reference 284 (shown in FIG. 7C) to the new position mark 282. Creating the new position mark is indicated by block 286 in the flow diagram of FIG. 6.

At this point, it can be seen that content editing system 172 holds references to two position marks (reference 246 to position mark 120 and reference 284 to position mark 282). Position mark 120 holds a reference 262 to change record 250 while position mark 282 holds a reference 288 to change record 268.

Figure 7D:
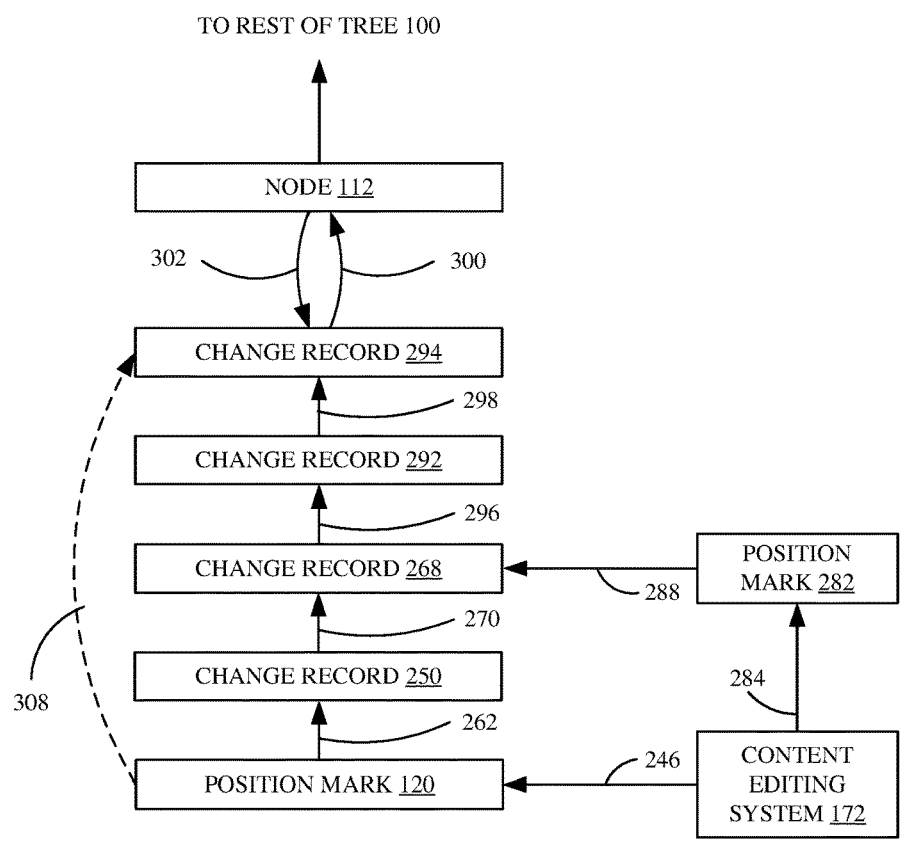

FIG. 7D is similar to FIG. 7C, except that it shows that node 112 has now generated two additional change records 292 and 294, but the position marks 120 and 282 have not updated themselves yet. The reference in change record 268 has been changed to reference 296, which now refers to change record 292. Change record 292 also has a reference 298 that refers to change record 294. Change record 294, in turn, has a reference 300 that refers to node 112, and node 112 has a reference 302 that now refers to change record 294.

Change record traversal logic 214, in position mark 120, will traverse the references 262, 270, 296 and 298 through change records 250, 268, 292 and 294 up to node 112, and, in doing so, change interpretation logic 216 will interpret the changes to node 112 that are reflected in each of those change records 250, 268, 292 and 294. Traversing the change records in this way is indicated by block 290 in the flow diagram of FIG. 6.

Position mark 120 then updates itself based upon the changes interpreted from all of the change records 250, 268, 292 and 294. For example, position mark 120 can update the offset value that it holds relative to node 112. It can update other information as well. This is indicated by block 306 in the flow diagram of FIG. 6.

Reference update logic 218 then updates the node/change record reference 210 in position mark 120 so that it now points to change record 294. This reference or link is indicated by the dashed arrow 308 in FIG. 7D, and the process of updating the reference to change record 294 is indicated by block 310 in the flow diagram of FIG. 6.

Reference update logic 218 then deletes its reference to any or all other change records. For instance, it deletes its reference 262 to change record 250. Deleting the reference to the old change record is indicated by block 312 in the flow diagram of FIG. 6.

Figure 7E:
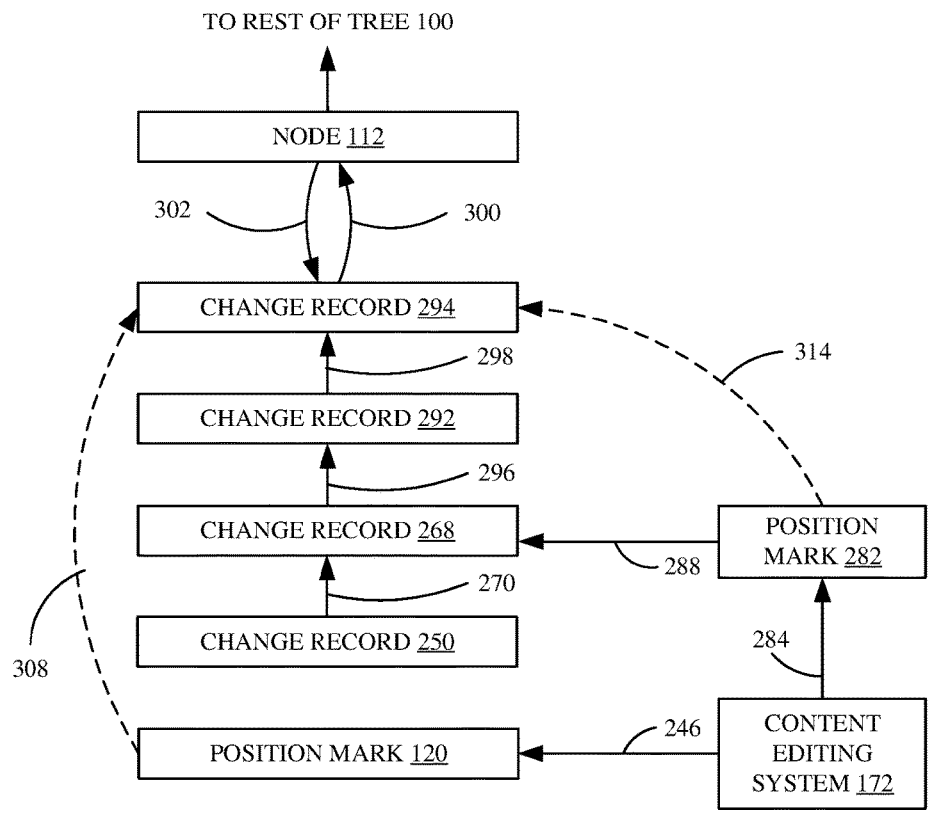
Figure 7F:
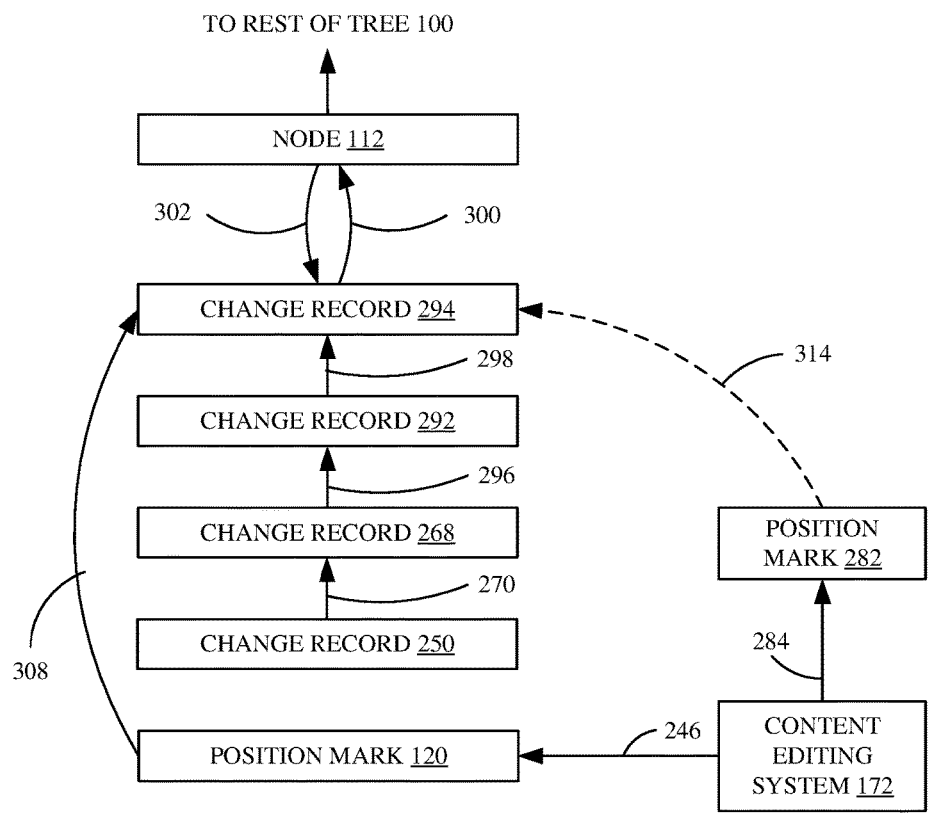
Figure 7G:
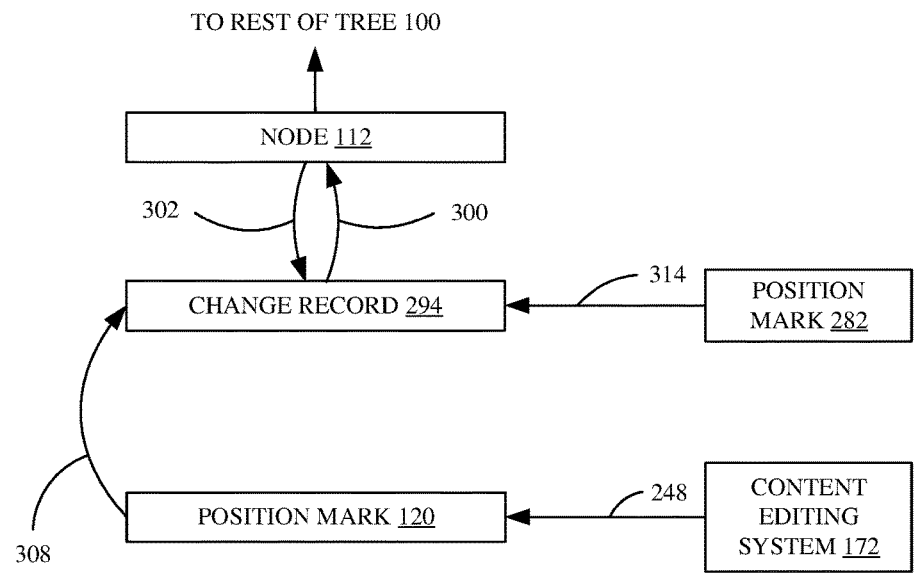

This results in the structure shown in FIG. 7E. It can now be seen that change record 250 has nothing that refers to it. Similarly, FIG. 7E shows that position mark 282 has similarly traversed links 296 and 298 and change records 268, 292, and 294 and updated itself and its own reference so that position mark 282 now contains a reference 314 to change record 294. In that case, reference 288 can be removed to yield the structure shown in FIG. 7F. Because change record 250 now has nothing that refers to it, memory management system 173 illustratively releases it from memory 174. For example, it can be collected by a garbage collection or other memory maintenance mechanism. Once it is removed, then change record 268 has nothing referring to it. Change record 268 can thus be released from memory as well. Once change record 268 is released, then change record 292 has nothing referring to it, and it can be released as well.

Figure 7H:
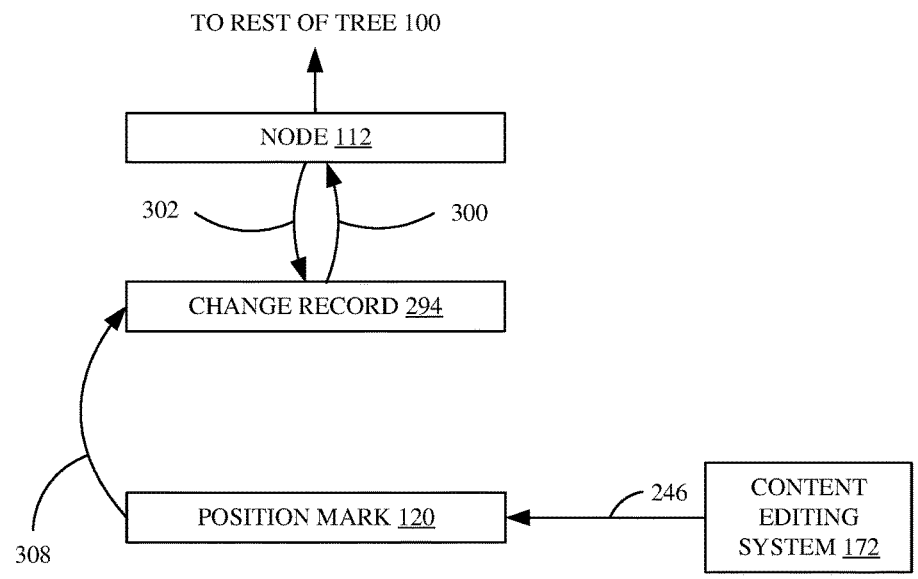

Next, assume that content editing system 172 no longer needs position mark 282. In that case, system 172 deletes its own reference 284 to position mark 282 yielding the structure illustrated in FIG. 7G. Now, because position mark 282 has nothing referring to it, it can be released in memory and collected by a garbage collector or other memory maintenance system. This yields the structure shown in FIG. 7H. Once content editing system 172 no longer needs position mark 120, it deletes its own reference 246 to position mark 120. In that case, position mark 120 can be released from memory.

Releasing all change records and position marks that are not referred to is indicated by block 316 in the flow diagram of FIG. 6. Collecting them and releasing them using a garbage collection mechanism is indicated by block 318. They can be released in other ways as well, and this is indicated by block 320.

It should also be noted that the present discussion can be applied in a collaborative environment. For instance, assume that users 158 and 160 are collaborating on an item of content 148 through content creation service computing system 132. In that case, the changes input by user 158 through content editing system 172 are propagated to client computing system 136 through service computing system 132 and network 138. Each content editing system 172 (in each client computing system) then keeps an object representing the changes and the client computing system they came from, as well as the position of the content editing system 172 in content 148, on its own client computing system 134. Thus, as the content editing system in client computing system 136 generates position marks, those position marks are maintained, in the object representing the content editing system 172 in client computing system 136, on client computing system 134. The same is done with changes sent by client computing system 136. In this way, content editing system 172 and the code in content tree 176 (e.g., the code in the nodes, change records and position marks) can be maintained, up-to-date, to reflect the changes made by user 160 as well. The changes are processed in the same way as if they were locally made, but an identifier is maintained to identify where the changes came from (e.g., the client computing system they came from). Memory management system 173 can thus manage editor memory 174 based not only on the changes made by content editing system 172, but by those made by the content editing system in client computing system 136, where collaboration is involved.

It can thus be seen that the present description enables memory management system 173 to maintain a much smaller footprint for content tree 176 than would otherwise be the case. As soon as a position mark or change record is no longer referred to by another object, memory management system 173 releases that memory for other usage. This reduces memory overrun issues and maintains a smaller memory footprint. It also makes the nodes in content tree 176 computationally independent of the number of position marks that refer to them. Change record generator 193, and reference update system 194, which are used to generate change records and modify the references in the node itself, and the in the newly created and last created change record, deal only with a constant size reference between the node, the last change record, and one previous change record (because the logic changes the reference in the previous change record to refer to the last change record). It does not need to deal with updating an entire collection of position marks which may be attached to the node. In fact, the node does not even need to know that any position marks are attached to it. Further, even though the total number of position mark modifications is generally proportional to the multiple of change records and position marks that are being used, the overall computational distribution benefits are seen at the innermost data processing levels of content tree modification. That is, the maintenance of the position marks is performed at the moment when the position marks are used. This often happens relatively infrequently relative to node changes. Thus, the present description saves on computational overhead as well.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 8:
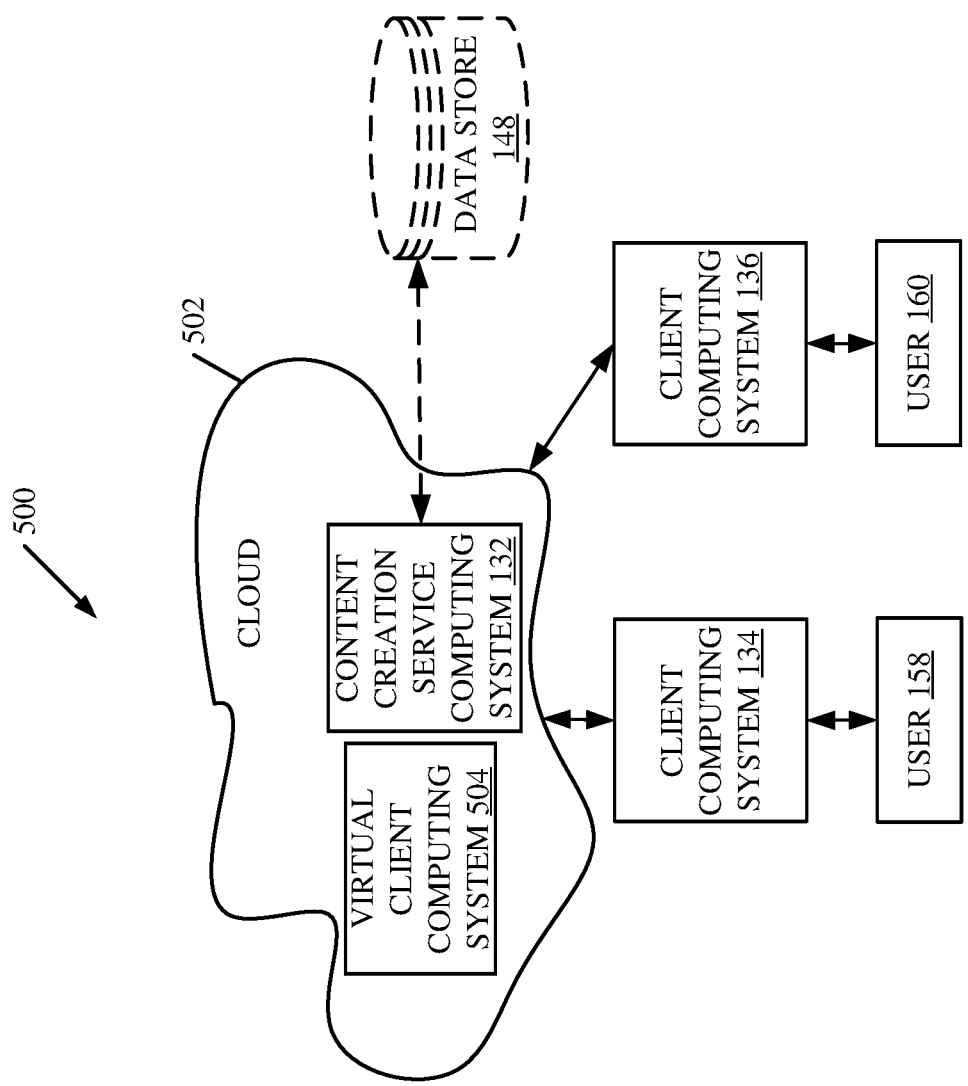
FIG. 8 is a block diagram showing one example of the architecture shown in FIG. 1, deployed in a cloud computing architecture.

FIG. 8 is a block diagram of architecture 130, shown in FIG. 2, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 130 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 8, some items are similar to those shown in FIG. 2 and they are similarly numbered. FIG. 8 specifically shows that computing system 132 can be located in cloud 502 (which can be public, private, or a combination where portions are public while others are private). Therefore, users 158 and 160 use client computing systems 134 and 136, respectively, to access those systems through cloud 502.

FIG. 8 also depicts another example of a cloud architecture. FIG. 8 shows that it is also contemplated that some elements of computing system 132 can be disposed in cloud 502 while others are not. By way of example, data store 148 can be disposed outside of cloud 502, and accessed through cloud 502. Regardless of where they are located, they can be accessed directly by systems 134 and 136, through a network (either a wide area network or a local area network), they can be hosted at a remote site by a service, or they can be provided as a service through a cloud or accessed by a connection service that resides in the cloud. All of these architectures are contemplated herein.

Similarly, FIG. 8 shows that some or all of client computing systems 134 and 136 (or other client computing systems) can be deployed as virtual client computing systems 504 in cloud 502 or in a different cloud. Users can access the virtual client(s) 504 through any of a variety of different user devices.

It will also be noted that architecture 130, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
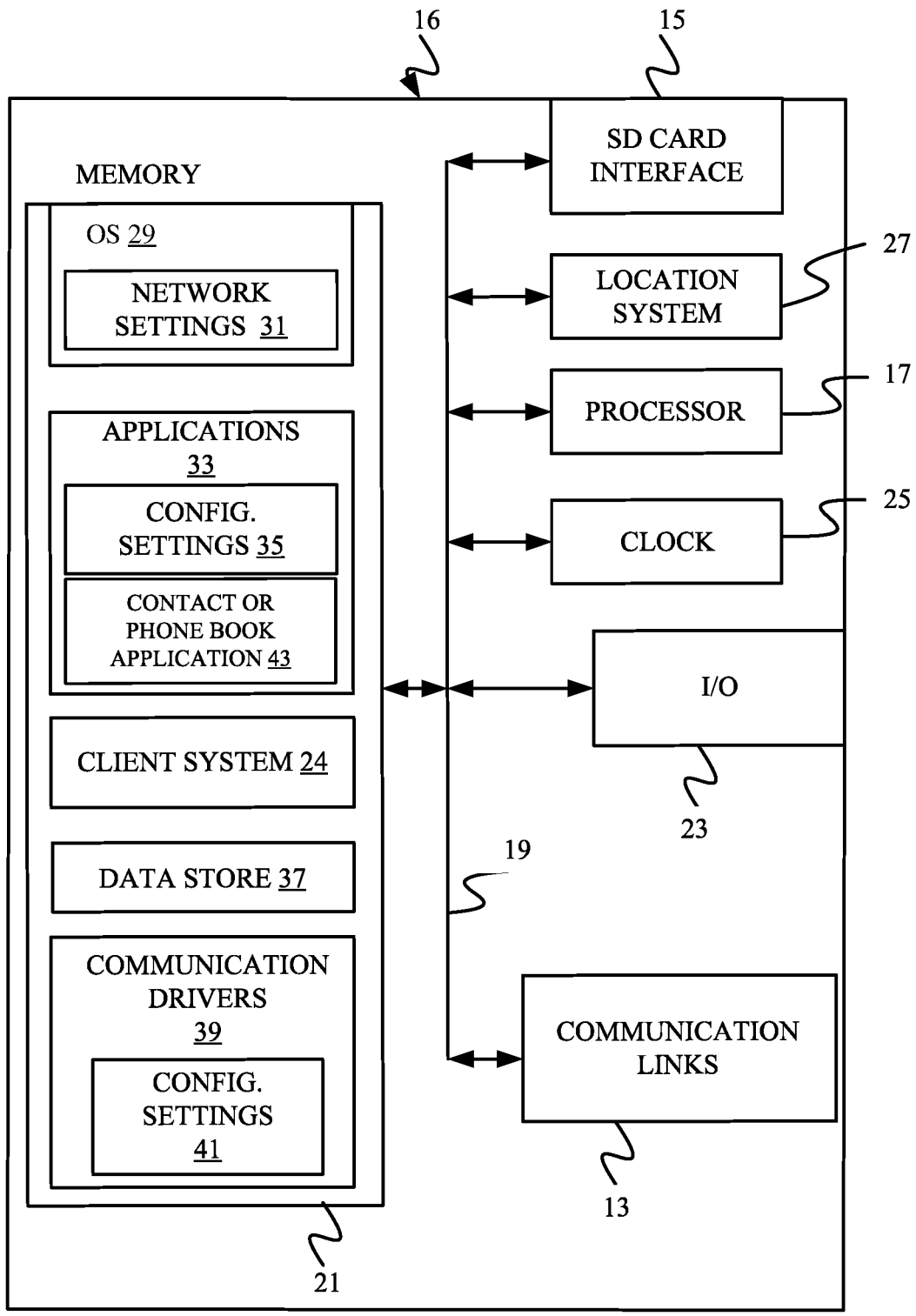
FIGS. 9-11 show examples of mobile devices that can be used in the architectures shown in the previous figures.
Figure 10:
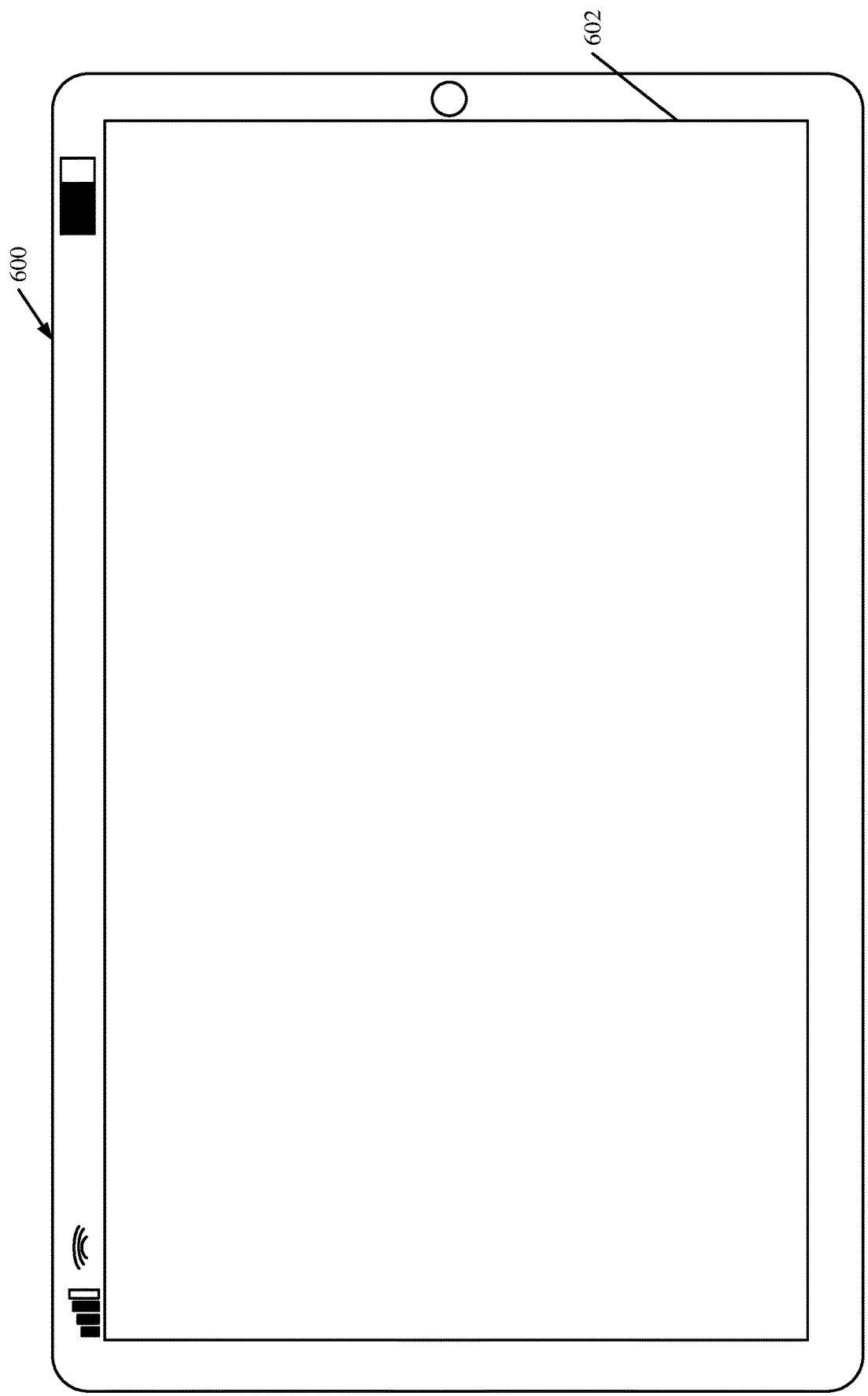
Figure 11:
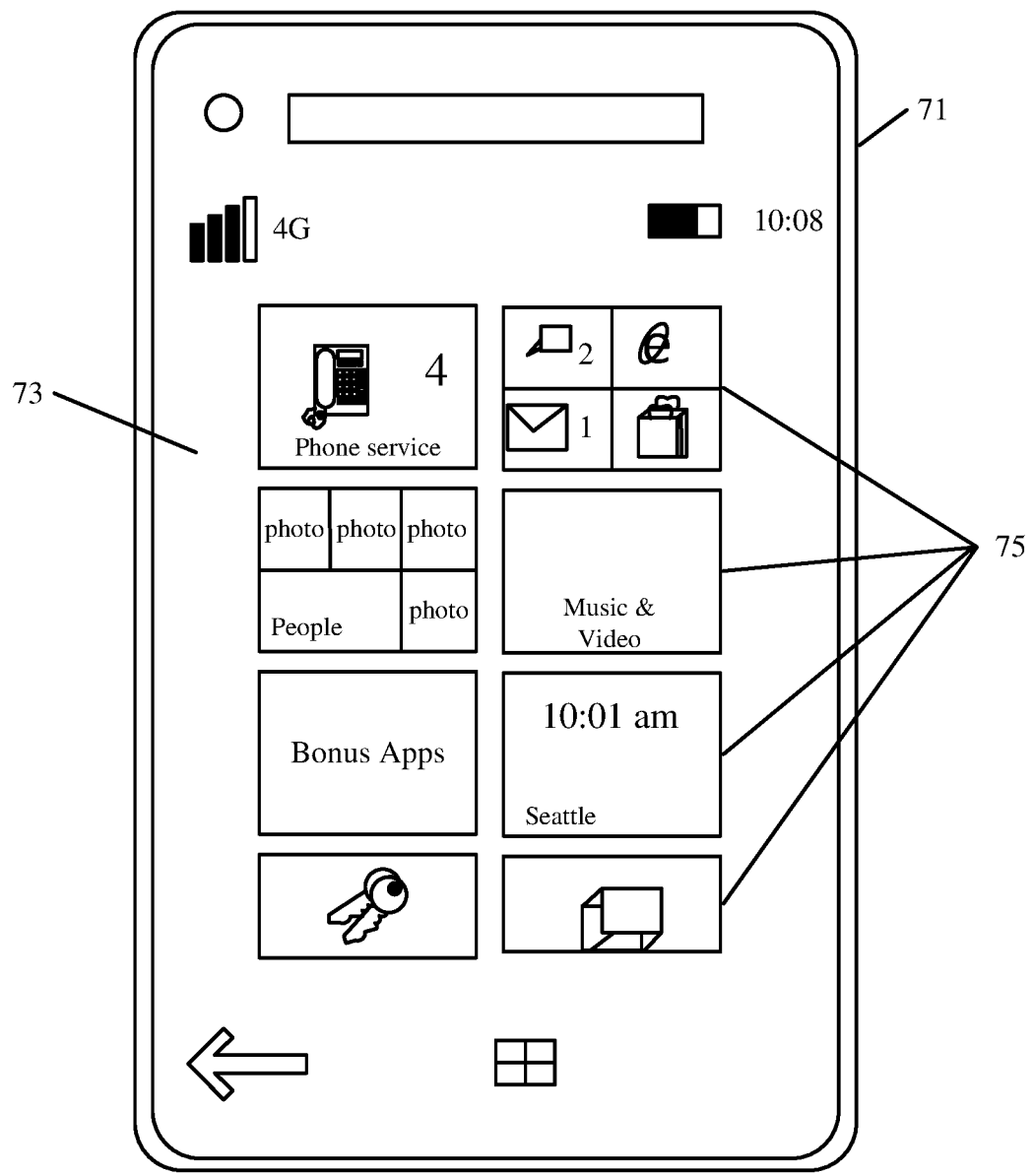

FIG. 9 is a simplified block diagram of one illustrative example of a handheld or mobile computing device that can be used as a user's or client's hand held device 16, in which the present system (or parts of it) can be deployed. FIGS. 10-11 are examples of handheld or mobile devices.

FIG. 9 provides a general block diagram of the components of a client device (or user device) 16 that can run components computing system 132 or client systems 134 and 136 that interacts with architecture 130, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 130. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 10 shows one example in which device 16 is a tablet computer 600. In FIG. 10, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 11 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
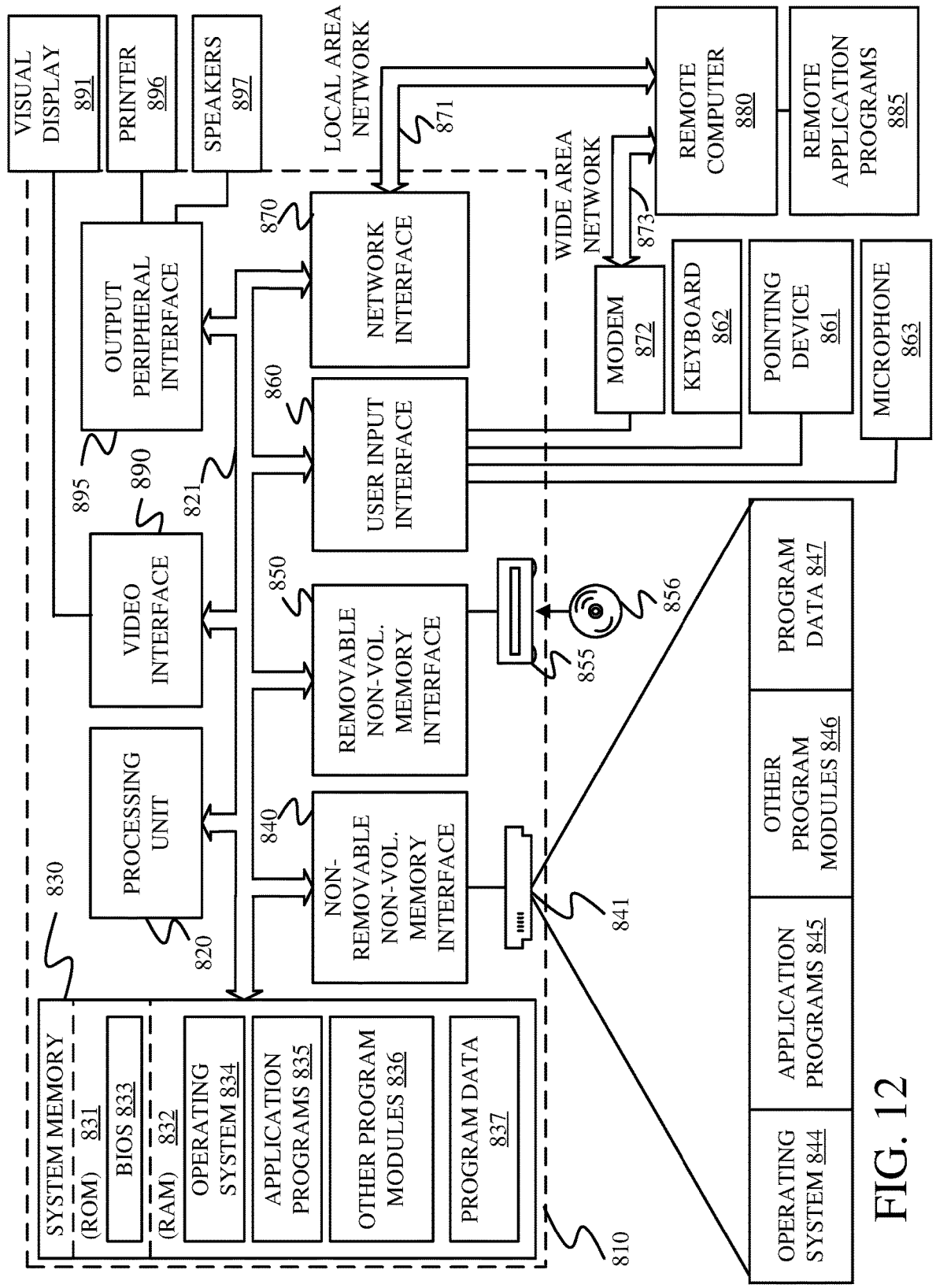
FIG. 12 is a block diagram showing one example of a computing environment that can be used in the architectures shown in the previous figures.

FIG. 12 is one example of a computing environment in which architecture 130, or parts of it, (for example) can be deployed. With reference to FIG. 12, an example system for implementing some embodiments includes a computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 2 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 12 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 12 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a document processing system, comprising:

a content tree generator that generates a content tree that represents a content document and has a node;

a content editing system that makes a modification to the node, the node including:

a change record generator that generates a first change record representing the modification to the node; and a reference update system that updates a reference in the first change record to refer to the node and that updates a reference in the node to refer to the first change record; and a text mark that has a one-way reference to the node, and a position value indicative of a position in the node, and text mark reference update logic that updates the one-way reference to the node to be a one-way reference to the first change record after the first change record is generated.

Example 2 is the document processing system of any or all previous examples wherein the content editing system is configured to make a subsequent modification to the node and wherein the change record generator is configured to generate a subsequent change record representing the subsequent modification to the node.

Example 3 is the document processing system of any or all previous examples wherein the reference update system in the node is configured to generate a reference in the subsequent change record to the node, update the reference in the first change record to be a one-way reference to the subsequent change record and then to delete the reference, in the node, to the first change record and generate a reference, in the node, to the subsequent change record.

Example 4 is the document processing system of any or all previous examples wherein the text mark comprises:

a new change record detector configured to detect generation of the subsequent change record, wherein the text mark reference update logic in the text mark is configured to update the one-way reference to the first change record to be a one-way reference to the subsequent change record.

Example 5 is the document processing system of any or all previous examples wherein the text mark comprises:

change record traversal logic configured to traverse the first change record and the subsequent change record using the one-way reference, in the text mark, to the first change record, the one-way reference, in the first change record, to the subsequent change record, and the reference, in the subsequent change record, to the node.

Example 6 is the document processing system of any or all previous examples wherein the text mark comprises:

change interpretation logic configured to identify the modification and subsequent modification based on traversal of the first change record and the subsequent change record and generate a change interpretation based on the identified modification and subsequent modification.

Example 7 is the document processing system of any or all previous examples wherein the text mark comprises:

offset update logic configured to update the position value in the text mark, identifying the position in the node, based on the change interpretation.

Example 8 is the document processing system of any or all previous examples wherein the text mark reference update logic is configured to update the one-way reference to the first change record, in the text mark, to be a one-way reference to the node.

Example 9 is the document processing system of any or all previous examples and further comprising:

a memory management system that allocates memory for the text mark, the node, the first change record and the subsequent change record and that releases memory allocated to any change record which is not referred to by any text mark, change record, or node.

Example 10 is the document processing system of any or all previous examples wherein the content editing system comprises:

a browser-based interface that receives edit user inputs and edits the content document based on the edit user inputs.

Example 11 is a method of processing a content document, comprising:

receiving a content tree that represents the content document and has a node;

making a modification to the node;

using a change record generator in the node to generate a first change record representing the modification to the node; and using a reference update system in the node to update a reference in the first change record to refer to the node and that update a reference in the node to refer to the first change record; and updating a text mark, that has a one-way reference to the node, and a position value indicative of a position in the node, by changing the one-way reference to the node to be a one-way reference to the first change record.

Example 12 is the method of any or all previous examples and further comprising:

making a subsequent modification to the node; and generating a subsequent change record representing the subsequent modification to the node.

Example 13 is the method of any or all previous examples and further comprising, using the reference update system in the node to perform steps of:

generating a reference in the subsequent change record to the node;

updating the reference in the first change record to be a one-way reference to the subsequent change record;

deleting the reference, in the node, to the first change record; and generating a reference, in the node, to the subsequent change record.

Example 14 is the method of any or all previous examples and further comprising:

detecting, with the text mark, generation of the subsequent change record; and updating the one-way reference to the first change record to be a one-way reference to the subsequent change record.

Example 15 is the method of any or all previous examples and further comprising:

traversing, with change record traversal logic in the text mark, the first change record and the subsequent change record using the one-way reference, in the text mark, to the first change record, the one-way reference, in the first change record, to the subsequent change record, and the reference, in the subsequent change record, to the node;

identifying, with change interpretation logic in the text mark, the modification and subsequent modification based on traversal of the first change record and the subsequent change record; and generating a change interpretation based on the identified modification and subsequent modification.

Example 16 is the method of any or all previous examples and further comprising:

updating, with offset update logic in the text mark, an offset value in the text mark to identify a position in the node, based on the change interpretation.

Example 17 is the method of any or all previous examples and further comprising:

updating, using the text mark reference update logic, the one-way reference to the first change record, in the text mark, to be a one-way reference to the node.

Example 18 is the method of any or all previous examples and further comprising:

allocating memory for the text mark, the node, the first change record and the subsequent change record; and releasing memory allocated to any change record which is not referred to by any text mark, change record, or node.

Example 19 is the method of any or all previous examples wherein the method of processing the content document is performed on a first client computing system and wherein making a modification comprises:

receiving an indication of the modification from a second client computing system; and identifying the modifications as being made from the second client computing system.

Example 20 is a document processing system, comprising:

a content tree generator that generates a content tree that represents a content document and has a node;

a content editing system, deployed on a cloud-based client computing system, that receives edit inputs through a browser-based interface and makes a modification to the node, the node including:

a change record generator that generates a first change record representing the modification to the node; and a reference update system that updates a reference in the first change record to refer to the node and that updates a reference in the node to refer to the first change record; and a text mark that has a one-way reference to the node, and a position value indicative of a position in the node, and text mark reference update logic that updates the one-way reference to the node to be a one-way reference to the first change record after the first change record is generated.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A document processing system, comprising:
  a content tree generator that generates a content tree that represents a content document and has a node;
  a content editing system that makes a modification to the node, the node including:
    a change record generator that generates a first change record representing the modification to the node; and
    a reference update system that updates a reference in the first change record to refer to the node and that updates a reference in the node to refer to the first change record; and
  a text mark that has a one-way reference to the node, and a position value indicative of a position in the node, and text mark reference update logic that updates the one-way reference to the node to be a one-way reference to the first change record after the first change record is generated, wherein
the content editing system is configured to make a subsequent modification to the node,
the change record generator is configured to generate a subsequent change record representing the subsequent modification to the node, and
the reference update system in the node is configured to generate a reference in the subsequent change record to the node, update the reference in the first change record to be a one-way reference to the subsequent change record and then to delete the reference, in the node, to the first change record and generate a reference, in the node, to the subsequent change record.

2. The document processing system of claim 1 wherein the text mark comprises:
a new change record detector configured to detect generation of the subsequent change record, wherein the text mark reference update logic in the text mark is configured to update the one-way reference to the first change record to be a one-way reference to the subsequent change record.

3. The document processing system of claim 2 wherein the text mark comprises:
change record traversal logic configured to traverse the first change record and the subsequent change record using the one-way reference, in the text mark, to the first change record, the one-way reference, in the first change record, to the subsequent change record, and the reference, in the subsequent change record, to the node.

4. The document processing system of claim 3 wherein the text mark comprises:
change interpretation logic configured to identify the modification and subsequent modification based on traversal of the first change record and the subsequent change record and generate a change interpretation based on the identified modification and subsequent modification.

5. The document processing system of claim 4 wherein the text mark comprises:
offset update logic configured to update the position value in the text mark, identifying the position in the node, based on the change interpretation.

6. The document processing system of claim 5 wherein the text mark reference update logic is configured to update the one-way reference to the first change record, in the text mark, to be a one-way reference to the node.

7. The document processing system of claim 6 and further comprising:
a memory management system that allocates memory for the text mark, the node, the first change record and the subsequent change record and that releases memory allocated to any change record which is not referred to by any text mark, change record, or node.

8. The document processing system of claim 1 wherein the content editing system comprises:
a browser-based interface that receives edit user inputs and edits the content document based on the edit user inputs.

9. A method of processing a content document, the method comprising:
receiving a content tree that represents the content document and has a node;
making a modification to the node;
using a change record generator in the node to generate a first change record representing the modification to the node; and
using a reference update system in the node to update a reference in the first change record to refer to the node and that update a reference in the node to refer to the first change record;
updating a text mark, that has a one-way reference to the node, and a position value indicative of a position in the node, by changing the one-way reference to the node to be a one-way reference to the first change record;
making a subsequent modification to the node;
generating a subsequent change record representing the subsequent modification to the node; and
using the reference update system in the node,
generating a reference in the subsequent change record to the node,
updating the reference in the first change record to be a one-way reference to the subsequent change record,
deleting the reference, in the node, to the first change record, and
generating a reference, in the node, to the subsequent change record.

10. The method of claim 9 and further comprising:
detecting, with the text mark, generation of the subsequent change record; and
updating the one-way reference to the first change record to be a one-way reference to the subsequent change record.

11. The method of claim 10 and further comprising:
traversing, with change record traversal logic in the text mark, the first change record and the subsequent change record using the one-way reference, in the text mark, to the first change record, the one-way reference, in the first change record, to the subsequent change record, and the reference, in the subsequent change record, to the node;
identifying, with change interpretation logic in the text mark, the modification and subsequent modification based on traversal of the first change record and the subsequent change record; and
generating a change interpretation based on the identified modification and subsequent modification.

12. The method of claim 11 and further comprising:
updating, with offset update logic in the text mark, an offset value in the text mark to identify a position in the node, based on the change interpretation.

13. The method of claim 12 and further comprising:
updating, using the text mark reference update logic, the one-way reference to the first change record, in the text mark, to be a one-way reference to the node.

14. The method of claim 13 and further comprising:
allocating memory for the text mark, the node, the first change record and the subsequent change record; and
releasing memory allocated to any change record which is not referred to by any text mark, change record, or node.

15. The method of claim 9 wherein the method of processing the content document is performed on a first client computing system and wherein making a modification comprises:
receiving an indication of the modification from a second client computing system; and
identifying the modification as being made from the second client computing system.

16. A computing system comprising:
at least one processor; and memory storing instructions executable by the at least one processor, wherein the instructions, when executed, cause the computing system to:
  generate a content tree that represents a content document and includes a node;
  generate a modification to the node, the node including:
    a change record generator that generates a first change record representing the modification to the node; and
    a reference update system that updates a reference in the first change record to refer to the node and that updates a reference in the node to refer to the first change record;
  generate a text mark that has a one-way reference to the node, and a position value indicative of a position in the node;
  update the one-way reference to the node to be a one-way reference to the first change record after the first change record is generated;
  generate a subsequent modification to the node;
  generate a subsequent change record representing the subsequent modification to the node;
  generate a reference in the subsequent change record to the node;
  update the reference in the first change record to be a one-way reference to the subsequent change record;
  delete the reference, in the node, to the first change record; and
  generate a reference, in the node, to the subsequent change record.

17. The computing system of claim 16, wherein the instructions cause the computing system to:
  detect generation of the subsequent change record; and
  update the one-way reference to the first change record to be a one-way reference to the subsequent change record.

18. The computing system of claim 17, wherein the instructions cause the computing system to:
  traverse the first change record and the subsequent change record using the one-way reference, in the text mark, to the first change record, the one-way reference, in the first change record, to the subsequent change record, and the reference, in the subsequent change record, to the node.

19. The computing system of claim 18, wherein the instructions cause the computing system to:
  identify the modification and subsequent modification based on traversal of the first change record and the subsequent change record and generate a change interpretation based on the identified modification and subsequent modification.

20. The computing system of claim 16, wherein the instructions cause the computing system to:
  provide a browser-based interface that receives edit user inputs and edits the content document based on the edit user inputs.

* * * * *